(12) United States Patent
Briggs

(10) Patent No.: US 10,032,121 B2
(45) Date of Patent: Jul. 24, 2018

(54) SYSTEM AND METHOD FOR MANAGING AND IMPLEMENTING PROCEDURES AND PRACTICES

(75) Inventor: Jason Rex Briggs, El Dorado Hills, CA (US)

(73) Assignee: Marketing Evolution, Rancho Cordova, CA (US)

( * ) Notice: Subject to any disclaimer, the term of this patent is extended or adjusted under 35 U.S.C. 154(b) by 312 days.

(21) Appl. No.: 13/159,148

(22) Filed: Jun. 13, 2011

(65) Prior Publication Data

US 2012/0317209 A1 Dec. 13, 2012

(51) Int. Cl.
*G06Q 10/00* (2012.01)
*G06Q 10/06* (2012.01)
*G06Q 30/02* (2012.01)

(52) U.S. Cl.
CPC ......... *G06Q 10/06* (2013.01); *G06Q 30/0241* (2013.01)

(58) Field of Classification Search
CPC .......................................... G06Q 10/00–50/00
USPC ............................................. 705/7.11–7.42
See application file for complete search history.

(56) References Cited

U.S. PATENT DOCUMENTS

| | | | |
|---|---|---|---|
| 5,530,861 A * | 6/1996 | Diamant et al. | 705/7.21 |
| 6,339,832 B1 * | 1/2002 | Bowman-Amuah | 714/35 |
| 6,434,568 B1 * | 8/2002 | Bowman-Amuah | |
| 6,434,628 B1 * | 8/2002 | Bowman-Amuah | 714/48 |
| 6,618,730 B1 * | 9/2003 | Poulter et al. | 705/7.27 |
| 6,662,215 B1 | 12/2003 | Moskowitz et al. | |
| 6,772,129 B2 | 8/2004 | Alvarez et al. | |
| 7,127,059 B2 * | 10/2006 | Galvin | 379/265.03 |
| 7,139,757 B1 * | 11/2006 | Apollonsky | G06F 17/30722 |
| 7,155,402 B1 | 12/2006 | Dvorak | |
| 7,418,403 B2 * | 8/2008 | Reid et al. | 705/7.42 |

(Continued)

FOREIGN PATENT DOCUMENTS

| | | |
|---|---|---|
| JP | 2000-148879 | 5/2000 |
| KR | 2011-0007349 | 1/2011 |
| WO | 2001015030 | 3/2001 |

OTHER PUBLICATIONS

International Search Report and Written Opinion in application No. PCT/US2012/042145 dated Feb. 20, 2013 pp. 1-10.

(Continued)

*Primary Examiner* — Alan S Miller
(74) *Attorney, Agent, or Firm* — Meyertons, Hood, Kivlin, Kowert & Goetzel, P.C.

(57) ABSTRACT

A method of implementing a procedure in one or more organizations includes storing content messages relating to procedures (such as best practices). A procedure to be performed by one or more responsible persons is identified. A workflow timeline for the procedure is generated. The workflow timeline includes actions for the procedure, a sequence for the actions, and responsible persons assigned to the actions. An activation for the workflow timeline is received from a timeline initiator. Times or due dates for performing actions on the workflow timeline, a responsible person to perform at least one of the actions, and content messages for at least one of the actions are automatically determined. The content messages provide information relating to the procedure. Content messages for one or more of the actions are automatically sent to the responsible person determined for the one or more actions.

19 Claims, 6 Drawing Sheets

(56) References Cited

U.S. PATENT DOCUMENTS

| | | | |
|---|---|---|---|
| 7,707,059 B2 | 4/2010 | Reed et al. | |
| 7,769,622 B2* | 8/2010 | Reid et al. | 705/7.42 |
| 7,933,926 B2* | 4/2011 | Ebert | 707/793 |
| 7,949,561 B2 | 5/2011 | Briggs | |
| 7,996,488 B1* | 8/2011 | Casabella et al. | 709/217 |
| 8,090,624 B2* | 1/2012 | Reid | G06Q 10/063 705/26.1 |
| 8,302,127 B2 | 10/2012 | Klarfeld et al. | |
| 8,321,273 B2 | 11/2012 | Briggs | |
| 8,423,406 B2 | 4/2013 | Briggs | |
| 2001/0020236 A1 | 9/2001 | Cannon | |
| 2002/0007300 A1* | 1/2002 | Slatter | 705/9 |
| 2002/0052769 A1* | 5/2002 | Navani et al. | 705/7 |
| 2002/0091558 A1* | 7/2002 | Anderson et al. | 705/9 |
| 2002/0198775 A1 | 12/2002 | Ryan | |
| 2003/0004766 A1* | 1/2003 | Sandoval et al. | 705/7 |
| 2003/0074252 A1 | 4/2003 | Chandler-Pepelnjak et al. | |
| 2003/0078832 A1 | 4/2003 | Alvarez | |
| 2003/0083891 A1* | 5/2003 | Lang et al. | 705/1 |
| 2003/0172075 A1* | 9/2003 | Reisman | 707/10 |
| 2003/0212580 A1* | 11/2003 | Shen | 705/2 |
| 2003/0217053 A1* | 11/2003 | Bachman et al. | 707/4 |
| 2003/0217054 A1* | 11/2003 | Bachman et al. | 707/4 |
| 2003/0220707 A1* | 11/2003 | Budinger et al. | 700/97 |
| 2003/0225469 A1* | 12/2003 | DeRemer et al. | 700/96 |
| 2004/0093296 A1 | 5/2004 | Phelan et al. | |
| 2004/0103017 A1 | 5/2004 | Reed et al. | |
| 2004/0122853 A1* | 6/2004 | Moore | 707/103 R |
| 2005/0004815 A1* | 1/2005 | Machtelinck | 705/2 |
| 2005/0027585 A1* | 2/2005 | Wodtke et al. | 705/9 |
| 2005/0138031 A1* | 6/2005 | Wefers | 707/9 |
| 2005/0216339 A1 | 9/2005 | Brazell et al. | |
| 2005/0234767 A1* | 10/2005 | Bolzman | G06Q 10/06393 705/7.39 |
| 2006/0026166 A1* | 2/2006 | Sattler et al. | 707/10 |
| 2006/0041480 A1 | 2/2006 | Briggs | |
| 2006/0069605 A1* | 3/2006 | Hatoun | 705/9 |
| 2006/0074734 A1* | 4/2006 | Shukla et al. | 705/8 |
| 2006/0161879 A1* | 7/2006 | Lubrecht et al. | 717/101 |
| 2006/0200549 A1 | 9/2006 | Soto et al. | |
| 2006/0241997 A1* | 10/2006 | Bhatawdekar et al. | 705/9 |
| 2007/0100669 A1* | 5/2007 | Wargin et al. | 705/4 |
| 2007/0234301 A1* | 10/2007 | Garvey et al. | 717/124 |
| 2008/0020364 A1* | 1/2008 | Wattendorf | G09B 5/00 434/322 |
| 2008/0065479 A1 | 3/2008 | Tomlin et al. | |
| 2008/0091496 A1* | 4/2008 | Gurpinar et al. | 705/8 |
| 2008/0104039 A1* | 5/2008 | Lowson | G06Q 30/00 |
| 2008/0126476 A1 | 5/2008 | Nicholas et al. | |
| 2008/0133342 A1 | 6/2008 | Criou | |
| 2009/0018882 A1* | 1/2009 | Burton et al. | 705/7 |
| 2009/0030780 A1 | 1/2009 | York | |
| 2009/0112678 A1* | 4/2009 | Luzardo | 705/8 |
| 2009/0125337 A1* | 5/2009 | Abri | 705/3 |
| 2009/0125362 A1* | 5/2009 | Reid et al. | 705/8 |
| 2009/0182580 A1* | 7/2009 | Martin et al. | 705/3 |
| 2009/0228253 A1 | 9/2009 | Tolone et al. | |
| 2009/0265634 A1* | 10/2009 | Beringer | G06Q 10/10 715/733 |
| 2010/0010968 A1 | 1/2010 | Redlich et al. | |
| 2010/0036509 A1 | 2/2010 | Salle | |
| 2010/0100414 A1 | 4/2010 | Lin et al. | |
| 2010/0106533 A1* | 4/2010 | Alvarez | G06Q 10/06 705/4 |
| 2010/0106546 A1* | 4/2010 | Sproule | 705/7 |
| 2010/0121685 A1* | 5/2010 | Mahadevan et al. | 705/11 |
| 2010/0191601 A1 | 7/2010 | Matz | |
| 2010/0274889 A1* | 10/2010 | Carter | G06F 17/30867 709/224 |
| 2010/0280962 A1 | 11/2010 | Chan | |
| 2010/0332311 A1 | 12/2010 | Jilk | |
| 2011/0099048 A1 | 4/2011 | Weiss | |
| 2011/0125544 A1* | 5/2011 | Shtub | 705/7.23 |
| 2011/0313814 A1 | 12/2011 | Briggs | |
| 2011/0320260 A1 | 12/2011 | Briggs | |
| 2012/0011239 A1* | 1/2012 | Svane et al. | 709/223 |
| 2012/0089455 A1 | 4/2012 | Belani | |
| 2012/0150574 A1* | 6/2012 | Reid et al. | 705/7.11 |
| 2012/0203589 A1* | 8/2012 | Eggena et al. | 705/7.15 |
| 2012/0317209 A1 | 12/2012 | Briggs | |
| 2013/0014153 A1 | 1/2013 | Bhatia et al. | |
| 2013/0124302 A1 | 5/2013 | Briggs | |
| 2014/0040008 A1 | 2/2014 | Belani | |
| 2014/0074587 A1 | 3/2014 | Briggs | |

OTHER PUBLICATIONS

NPL01: Dravillas, Jim, et al., Cross-Media and the Web: Best Practices for Using the Internet to Measure Cross-Media Advertising Campaigns, Paper presented at the ARF Week of Workshops, Sep. 24, 2003, NYC.

NPL02: Briggs, Rex, "Cross-Media Measurement", downloaded Aug. 12, 2010 from http://www.marketingevolution.com/downloads/industry—related/me—white—paper.cross—media—methodology.pdf.

NPL03: lab, "New Cross Media Optimization Studies (XMOS)", press release dated Feb. 10, 2003, downloaded Aug. 12, 2010 from http://www.iab.net/about—the—iab/recent—press—releases/press—release—archive/press—release/4623.

NPL04: "Stanford Course Example", course example with link to datafile "shoes.dat" attached to Google search "compare advertising campaigns" performed Jan. 11, 2011.

NPL05: Kugel, Christian, "Decay Effects in Online Advertising", presentation at the ARF 50th Annual Convention, Apr. 26-28, 2004, New York City.

NPL06: Coffey, S. and Mazumdar, M., "The reach and frequency approach to advertising planning on the Internet", 2002, downloaded Nov. 13, 2012 from http://www.websm.org/db/12/490/rec/.

NPL07: Dialog document: Zufryden, Fred S., Journal of Advertising Research, v 40, n 6, p. 65, Nov. 2000.

NPL08: Branch and bound, integer, and non-integer programming, J. J. H. Forrest, J. A. Tomlin. Annals of Operations Research. Basel; Feb. 2007. vol. 149, Iss. 1; p. 81 (7 pages).

NPL09: Ranking Factors in Devising Practical POI Search Model, ICSDM2011 IEEE International Conference on Jun. 29, 2011-Jul. 1, 2011, pp. 267-272.

NPL10: The Model for Optimizing replenishment point with service level constraints, WiCOM2007, International Conference on Sep. 21-15, 2007, pp. 3347-3350.

NPL11: Research on the Influence Mechanism of Community Value on Customer Loyalty, FITME2010, International Conference on Oct. 9-10, 2010, pp. 178-181.

Non-Final Office Action for U.S. Appl. No. 11/209,469 dated Aug. 16, 2010.

Notice of Allowance for U.S. Appl. No. 11/209,469 dated Jan. 11, 2011.

Notice of Allowance for U.S. Appl. No. 13/113,807 dated Jul. 24, 2012.

Notice of Allowance for U.S. Appl. No. 13/113,814 dated Dec. 14, 2012.

Non-Final Office Action for U.S. Appl. No. 13/862,848 dated Jun. 8, 2015.

Final Office Action for U.S. Appl. No. 13/862,848 dated Mar. 21, 2016.

Non-Final Office Action for U.S. Appl. No. 13/862,848 dated Mar. 30, 2017.

Final Office Action for U.S. Appl. No. 13/862,848 dated Dec. 14, 2017.

Non-Final Office Action for U.S. Appl. No. 12/491,996 dated Aug. 24, 2012.

Final Office Action for U.S. Appl. No. 12/491,996 dated Jun. 26, 2013.

NPL12: International Search Report and Written Opinion for PCT/US2011/040955 dated Jan. 10, 2012.

Non-Final Office Action for U.S. Appl. No. 13/787,191 dated Jun. 6, 2014.

(56) References Cited

OTHER PUBLICATIONS

Non-Final Office Action for U.S. Appl. No. 13/787,191 dated Mar. 13, 2015.
Final Office Action for U.S. Appl. No. 13/787,191 dated Feb. 2, 2016.
Non-Final Office Action for U.S. Appl. No. 13/787,191 dated Aug. 25, 2017.
Non-Final Office Action for U.S. Appl. No. 13/666,686 dated Jun. 20, 2014.
Non-Final Office Action for U.S. Appl. No. 13/666,686 dated Jan. 30, 2015.
Final Office Action for U.S. Appl. No. 13/666,686 dated Dec. 1, 2015.
Non-Final Office Action for U.S. Appl. No. 13/666,686 dated Aug. 11, 2016.
Final Office Action for U.S. Appl. No. 13/666,686 dated May 5, 2017.
Non-Final Office Action for U.S. Appl. No. 13/666,686 dated Feb. 23, 2018.
NPL14: International Search Report for PCT/US2012/063107 dated Apr. 1, 2013.

* cited by examiner

SYSTEM AND METHOD FOR MANAGING AND IMPLEMENTING PROCEDURES AND PRACTICES

BACKGROUND

Field

The present disclosure relates generally to implementation and management of practices and procedures within an organization or across organizations. More particularly, the present disclosure relates to automated systems for implementing best practices.

Description of the Related Art

Organizations strive to improve their practices and procedures in order to remain competitive. Many organizations seek to employ "best practices" and standard operating procedures in various endeavors undertaken by members of the organization, both in providing services and products to customers and in internal operations.

Some firms maintain files with content relating to standard operating procedures and best practices. The information is typically stored in paper files, and, more recently, in electronic files or databases. Typical approaches to storing and retrieving content about standard operating procedures and best practices may have several shortcomings. These shortcomings can include:

1. The content may be scattered throughout voluminous documents and throughout the organization. Also, the content may be poorly organized and not kept current. As such, it can be difficult to find the content that is truly relevant to a person's situation and specific need.

2. Incentives are lacking to add content to the system.

3. The content that is added to the system may be one-dimensional documents and reports, rather than intelligently indexed content.

4. There is heavy reliance on the user to recognize a need for best practice information, and to take affirmative action to search for it.

5. The barriers to finding useful content work as a disincentive for future use.

6. There is no mechanism to indicate how useful the content the users found was.

Marketing organizations sometimes use simulation software to conduct market research. In some cases, simulation software can improve allocation of marketing resources of an organization or its customers. Marketing simulation software may, however, fail to provide the best marketing solutions to an organization. Among other things, typical simulation software may not implement the best practices known within an organization for carrying out a marketing campaign. Moreover, the simulation software may fail to provide mechanisms for improving marketing and research practices over time.

SUMMARY

Systems and methods for managing and implementing procedures and practices are described.

In one embodiment, a method of implementing a procedure in one or more organizations includes storing, in a memory of a computer system, content messages relating to procedures. The procedures may be, for example, best practices. A procedure to be performed by one or more responsible persons is identified. A workflow timeline for the procedure is generated. The workflow timeline includes actions for the procedure, a sequence for the actions, and responsible persons assigned to the actions. An activation for the workflow timeline is received from a timeline initiator. Times or due dates for performing actions on the workflow timeline, a responsible person to perform at least one of the actions, and content messages for at least one of the actions are automatically determined. The content messages provide information relating to the procedure. Content messages for one or more of the actions are automatically sent to the responsible person determined for the one or more actions.

In one embodiment, a method of modifying a standard for actions in a procedure includes retrieving, from a memory of a computer system, a message relating to a standard for an action in the procedure. A message is sent to one or more responsible persons within the organization relating to the action to be carried out by the responsible person. A feedback item is received from the responsible person about the action. A standard is modified based on the feedback item received from the responsible person. The modified standard is stored in the memory of the computer system.

In one embodiment, a method of carrying out a procedure includes retrieving, from a memory of a computer system, information content relating to a standard for one or more actions in the procedure. A message is automatically generated based on the retrieved information content. The message relates to a standard for one or more actions to be carried out by at least one of the responsible persons in the procedure. The message is automatically sent to a responsible person.

In one embodiment, a system for managing standards for procedures in organizations includes a memory including a database that stores data relating to standards for procedures of an organization and a procedure engine. The procedures may be associated with a content owner. The procedure engine can automatically send, to content users, content messages associated with a workflow timeline for the procedures. The content messages are based on standards for the procedure. The system can automatically receive, from one or more of the content users, feedback about one or more of the content messages associated with the workflow timeline, and automatically display, to one or more content owners for the content messages, information relating to the standards for the procedure. The displayed information may be based on the feedback from the content users.

Figure 1:
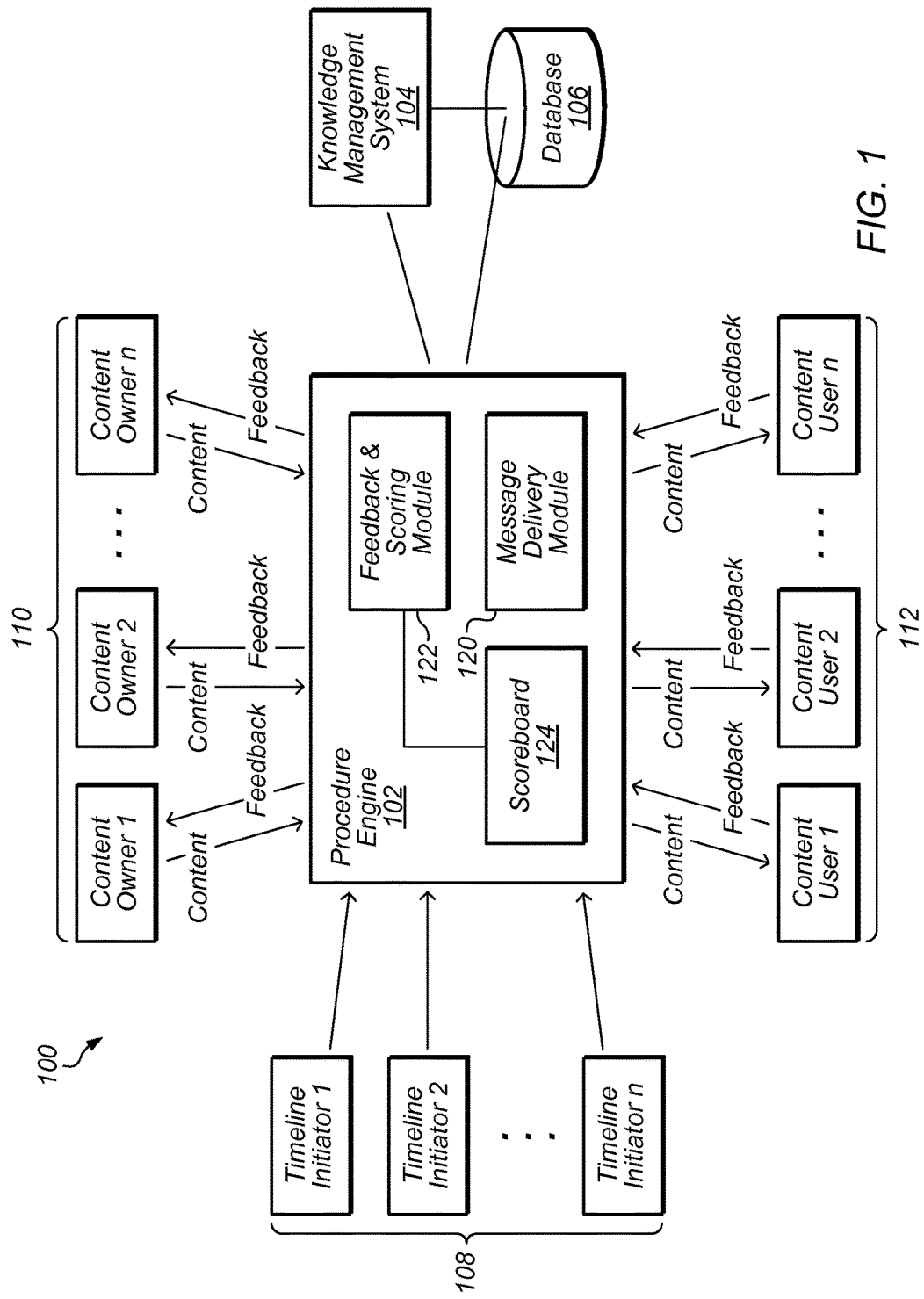
FIG. 1 illustrates one embodiment of a procedure engine that can allow participants to access, create, and modify manage content relating to procedures, such as best practices and standard operating procedures.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As used herein, an item of "content" or a "content message" includes any item of information, instruction, notification, guidance, results, rule, suggestion, or combination thereof, relating to one or more actions, events, practices, or procedures. A content message may be in textual form, graphical form, or a combination both.

As used herein, "procedure" means a set or series of one or more actions, tasks, operations, communications, or steps to achieve a desired result. A procedure may be carried out or implemented by one or more persons, who may be in one or more organizations. In certain embodiments, a procedure is a best practice. In certain embodiments, a procedure is a standard operating procedure. Procedures may be used, in various embodiments, in any of a variety of fields, endeavors, or programs. Examples include marketing research, marketing campaigns, health promotion programs, disease prevention programs, municipal planning, inventory management, and manufacturing.

As used herein, "standard" relates to an established model or manner for performing an action or procedure. A standard may, in some embodiments, include a best practice.

As used herein, "standard procedure" means a procedure that conforms to an established or model manner of performance. In some embodiments, a standard procedure is a standard operating procedure of a particular organization. The standard operating procedure may be established, for example, in a company manual, a company handbook, or by a standards organization for an industry.

As used herein, "best practice" means a practice, method, technique, solution, or approach that is considered (at least, within a given organization or group) to be the best known or best documented for achieving a desired result. The desired result may be a specifically defined result, such as achieving a specified level of customer participation in a particular marketing campaign, or a general result, such as a general improvement in the level of customer satisfaction or employee morale. As used herein, "tactical best practices" are low-level recommendations for how best to leverage general or specific assets (for example, media assets). As an example, in a marketing context, there may be best practice that applies to carrying out the activities such as: formulating creative for online display; or leveraging the benefits of SEO (purchasing keywords). As another example, in a malaria prevention context, a best practice may include particular techniques for deploying mosquito nets. Tactical best practices may be suggested only when certain criteria apply (for example, when specific plan characteristics exist and/or assets are being leveraged).

As used herein, "feedback" means information including a critique, a comment, rating, ranking, recommendation, or suggestion relating to an action that has been taken or may be taken, or relating to content that has been provided to a participant.

As used herein, an "action" means an act, task, milestone, operation, step, process, or communication that can be performed, completed, or achieved by one or more persons.

As used herein, a "participant" includes any person or group of persons accessing or using a system. Examples of participants include content users, content owners, timeline initiators, and system administrators.

As used herein, a "procedure engine" means any system on which procedures for an organization can be generated, stored, updated, reported on, or managed. A procedure engine may be implemented on one or more computer systems. In some embodiments, a procedure engine is implemented by way of two or more computer systems connected to one another over a network. A procedure engine may include computer programs, hardware, or combinations thereof.

In some embodiments, content relating to practices and procedures, such as best practices or standard operating procedures, is stored on a computer system. The practices and procedures may be unique to a single organization, or may apply to any number of organizations. In certain embodiments, the practices and procedures are best practices. In one embodiment, the best practices are for marketing campaigns. Content users may receive items of content from the computer system. Content owners may access the computer system to create, modify, or manage content. In some embodiments, a computer system associates content items with a timeline created for a specific practice or procedure.

In some embodiments, content relating to practices and procedures is accessed by way of a procedure engine. The procedure engine may be implemented, for example, on one or more computer systems, such as a server. FIG. 1 illustrates one embodiment of a procedure engine that can allow participants can access, create, and modify manage content relating to procedures, such as best practices and standard operating procedures. System 100 includes procedure engine 102, knowledge management system 104, and database 106. Database 106 may be used to store information relating to procedures and practices. Procedure engine 102 and knowledge management system 104 may access data stored in database 106.

Timeline initiators 108, content owners 110, and content users 112 can access, receive information from, and send information to, procedure engine 102. For example, timeline initiators 108 can specify or provide to procedure engine 102 actions to be included on timelines for procedures. As another example, content owners 110 can provide content to procedure engine 102. As still another example, content users 112 can receive content from procedure engine 102. In some embodiments, a procedure engine is part of a knowledge management system.

Each of the participants (for example, timeline initiators 108, content owners 110, and content users 112) can be an individual or a group of individuals. For example, content user 1 may be an individual assigned to initiate a run of online advertising. As another example, content user 2 may be the staff of a marketing department. In one embodiment, timeline initiators 108, content owners 110, content users 112, access procedure engine 102 over client computer systems (for example, a personal computer system connected to a procedure engine server over a network).

In some embodiments, workflow timelines are established for one or more procedures. The workflow timelines may include a sequence of actions. For each action, a responsible person may be assigned. In addition, for each action, a time or deadline may be established. The timeline may flexible, allowing users, for example, to specify a start date, move the dates within the timeline, and add or delete tasks within the timeline. In some embodiments, a system includes a default assignment for who is responsible for the action (or to adjust assignments of who is responsible for each task). The timeline may be connected to a database of users, actions and content. In addition, the timeline may be connected to an algorithm that calculates when to send content, which content, and to whom.

Timeline Initiator

In some embodiments, each workflow timeline is activated by a timeline initiator. In some embodiments, the timeline initiator selects a workflow timeline that is already in the system such that the tasks and timing are already established. In this case, the timeline initiator may merely specify a start date for the workflow timeline. In other embodiments, a timeline initiator may create or establish a new workflow. Establishing a new workflow may involve defining one or more tasks, a sequence for the actions, who is involved with each task, and what is the relevant content (such as SOP/Best Practices) that would help the user perform the task well.

In some embodiments, establishing a timeline includes specifying one or more situational variables. Situational variables can be specified by a timeline initiator or by another user. Situational variables may be used, in one example, to modify SOP/Best practice recommendations that are pushed to users. In some embodiments, a situational variable filters the content (for example, which SOP/best practice) that is pushed to a user. For example, when a procedure engine is applied to marketing to implement best practices, a situational variable might be whether the brand is a dominant category leader or a category challenger. Dominant category leaders typically approach marketing differently than category challengers. Accordingly, the situational variable may be applied to filter which SOP/Best practice content is pushed to the content users.

Content User

In some embodiments, once a timeline has been established with its start date, and any situational variables have been specified, the system calculates what content should be delivered to users, what users should receive each content message, and when the standard operating procedures (SOP)/Best Practice content should be delivered to the content users. There may be multiple content users within in a given workflow.

As time unfolds, and tasks come up on the timeline, the person responsible for each task (for example, a content user) may receive content messages. The system may support pushing of content by any type of media. Examples of suitable media for delivering content messages may include email, text message, RSS feed, and website posting. In one embodiment, a content message includes an upcoming task and specific tips drawn from recommendations. In addition, the content message may include a link to access additional information (for example, a link identified as "more"). The link to additional information may connect the user to the topical content rated as most relevant for the user for a given task. In addition, the system may display an "age" rating. The age rating may show how old the SOP/Best Practice is.

In some embodiments, a content user provides feedback for a content message. Feedback may include a rating, a score, or comments. The feedback may include, for example, an assessment of how relevant the content was, an assessment of how useful the content was, or open-ended comments. Relevance, usefulness and comments may provide a feedback loop to the system and to content owners. The reward system may provide instant reinforcement for participants on a system.

In some embodiments, feedback from content users (for example, ratings, score, and comments, or any combination thereof) is used to determine future recommendations. In some instances, feedback is used to modify recommendations or content for only the user that provided the feedback. In other instances, feedback may affect recommendations or content for other content users (for example, other content users performing similar tasks in similar situations in the future.)

In some embodiments, a content user earns a reward for providing feedback, such as reward points. The user may receive points separately for 1) relevance, 2) usefulness and 3) open-ended comments.

Content Owner

In some embodiments, responsibility for an element or portion of content is assigned to a content owner. The content owner may add SOP/content, update the content, and respond to feedback from content users relating to the content. For any particular element or portion of content, there may be multiple content owners. In some embodiments, content is organized by the workflow task(s) that is relevant to, and to the content user(s) it is relevant to. Organizing content by workflow task and content user relevance can be done manually or automatically. In some embodiments, an abstract for an element of content is generated.

In some embodiments, a content owner is a curator of outside content feeds. An outside content feed can be manually or automatically scored as to which workflow tasks it relates to, and to which content users would find the content relevant. In one embodiment, the system treats the content owner scores for a workflow task and content user relevance as initial values. Once the system is in use, the values may be updated to reflect feedback by content users of the system.

In some embodiments, a system includes a user interface that allows a content owner to review and manage standard operating procedures and best practices. For example, a content owner may view all the standard operating procedures/best practices the content owner is responsible for, sort the standard operating procedures/best practices by their age since last update, or sort the standard operating procedures/best practices by the ratings they received from content users. The content owner can also view feedback (for example, comments by content users) related to each SOP/Best Practice. The content owner can use the feedback provided through the system to modify, create, or manage content. For example, the content owner may use feedback determine which SOP/Best practices are a priority for update.

Procedure engine 102 includes message delivery module 120. Message delivery module 120 may deliver messages to, and receive messages from, participants accessing procedure engine 102. Messages may be in any format, including email, text messages (such as an SMS message), HTML files, or audio messages. For example, message delivery module 120 may deliver a text message to a content user describing a best practice.

Ratings and Incentives System

In various embodiments, ratings, incentives, or both, are given to participants accessing and using a procedure engine. A rating may include, for example, a score, ranking, or another value. Ratings may have various types of scales or categories. Examples of a score include a numerical score (9.2 on a scale of 10.0), or discrete categories ("very relevant", "somewhat relevant", "not relevant".) Examples of incentives include reward points or recognition. In some embodiments, feedback management may be implemented through a module of a procedure engine. For example, procedure engine 102 includes feedback and scoring module 122.

Ratings or incentives may be based on various aspects of procedures analyzed, managed, or performed by participants. Ratings or incentives may also be based on content associated with the procedures. Ratings or incentives may be based, for example, on one or more actions by a participant, content produced or used by a participants, or information provided by the participant (for example, feedback about content used the participant). In one embodiment, a rating is given to a participant for an element of content accessed on the system. For example, a content owner can receive a rating for content created or managed by the content owner.

In some embodiments, a rating provides a measure of value of an element of content, such as how useful the content is in performing a procedure, or how current the content is. The rating may also be a measure of the content owner's performance in maintaining the content. For example, a content owner may receive a score of 9.2 on a scale of 10.0 for an item of content created by the user for a highly useful element of content, and a score of 2.4 on a scale of 10.0 for an item of content that is not very useful.

In some embodiments, ratings or incentives are based on feedback from participants accessing a system. For example, a content owner, or a particular element of content created by the content, is rated based on feedback from users of the content on the system. In certain embodiments, a content owner receives incentives for content (for example, reward points). Ratings that can be to a content owner include, for example: (1) a score for updating standard operating procedure/best practices, (2) usefulness scores for the standard operating procedure/best practices, and (3) scores for promptness in adding or modifying content in response to comments from content users (for example, when a content user scores a reply comment as highly useful.)

In some embodiments, a user receives a score or incentive for providing feedback. For example, a content user may receive reward points for providing feedback. The scores of content users may be displayed by the system to participants. In some embodiments, reward points can be redeemed for items of monetary value, such as gift cards, merchandise, travel vouchers, or cash. In addition to content users, any of the other participants on the system (such as content owners and timeline initiators) may also receive points for their participation or contributions. For example, a content creator may receive points for creating and updating content, the overall usefulness of the content, or quick responses to comments. As another example, a timeline initiator may receive points for setting up a campaign. In some embodiments, an incentive system is coupled to a knowledge management system. The incentive system may result in more and improved information in the knowledge management system.

In some embodiments, scores for one or more of the participants may be displayed by the system to other participants. For example, procedure engine 102 includes scoreboard 124. In one embodiment, scoreboard 124 is a leaderboard that displays to various participants who the top content users are (for example, the "top 10") based on reward points. Displaying scores on a leaderboard may inspire competition among participants.

Figure 2:
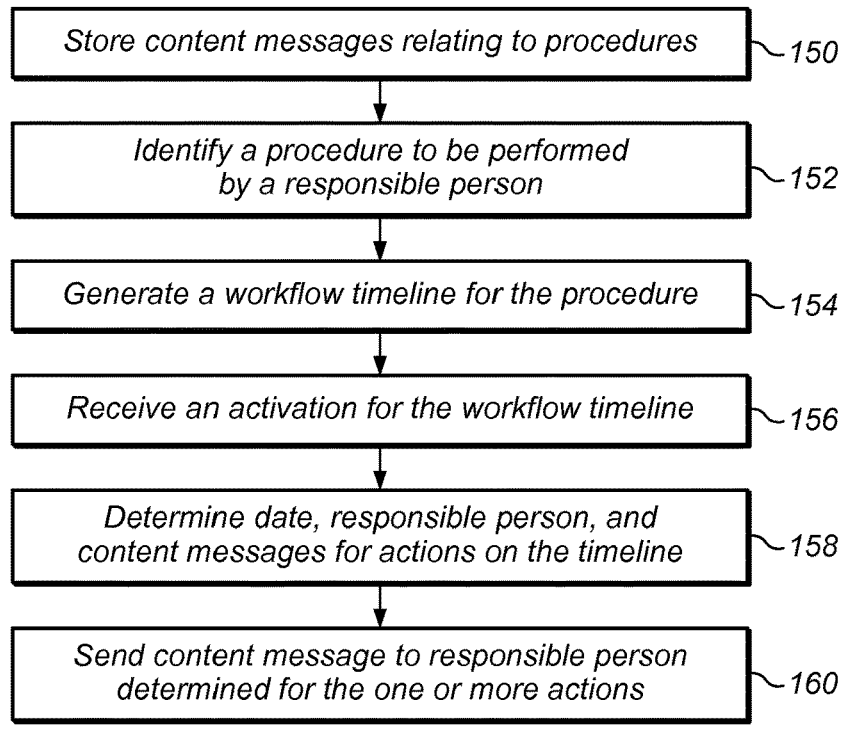
FIG. 2 illustrates one embodiment of implementing a procedure on a workflow timeline, with automatic generation of procedure-related content messages.

FIG. 2 illustrates one embodiment of implementing a procedure on a workflow timeline, with automatic generation of procedure-related content messages. At 150, content messages are stored relating to one or more procedures. At 152, a procedure to be performed by one or more responsible persons is identified. At 154, a workflow timeline is generated for the procedure.

At 156, the workflow timeline is activated. In some embodiments, the workflow timeline is activated by a timeline initiator. At 158, a date, responsible person, and content messages are determined for each action on the timeline. The content messages may relate, for example, to best practices for one or more of the actions on the timeline. At 160, content messages are sent to responsible persons for the one or more actions.

Figure 3:
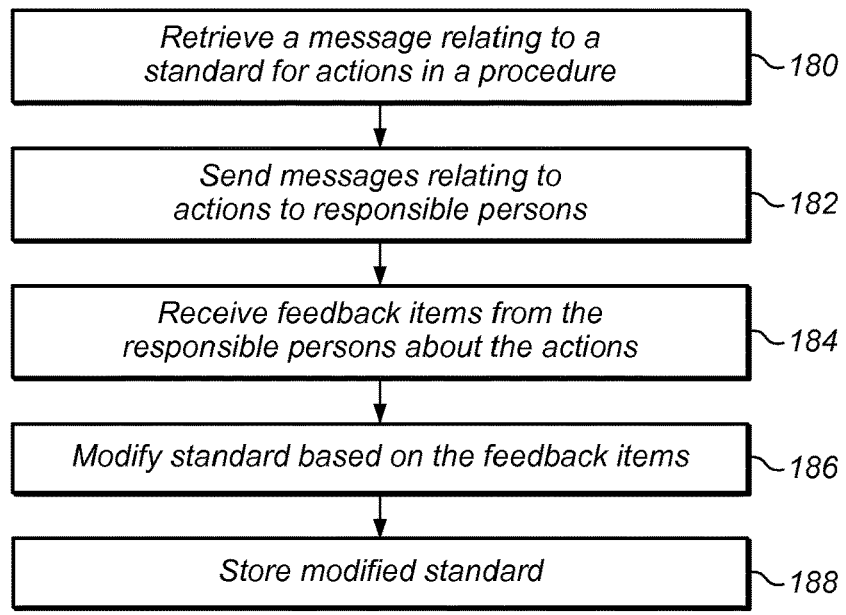
FIG. 3 illustrates one embodiment of modifying a standard for a procedure based on user feedback.

FIG. 3 illustrates one embodiment of modifying a standard for a procedure based on user feedback. At 180, a message is retrieved relating to a standard for one or more actions in a procedure. The message may be retrieved, for example, from a best practices database. At 182, the message relating to the one or more actions is sent to a responsible person.

At 184, feedback items are received from the responsible person about one or more of the actions. At 186, the standard for the procedure is modified based on the feedback items. At 188, the modified standard is stored. The modified standard may be stored, for example, in a best practices database.

In some embodiments, a standard is modified automatically. The standard may be modified automatically, for example, based on feedback from content users. In some embodiments, actions in a procedure may be carried out automatically. In a marketing context, changes or actions implemented automatically include bidding the price of search terms or automatically canceling a radio campaign. In a malaria prevention campaign, actions implemented automatically may include ordering more mosquito nets.

Figure 4:
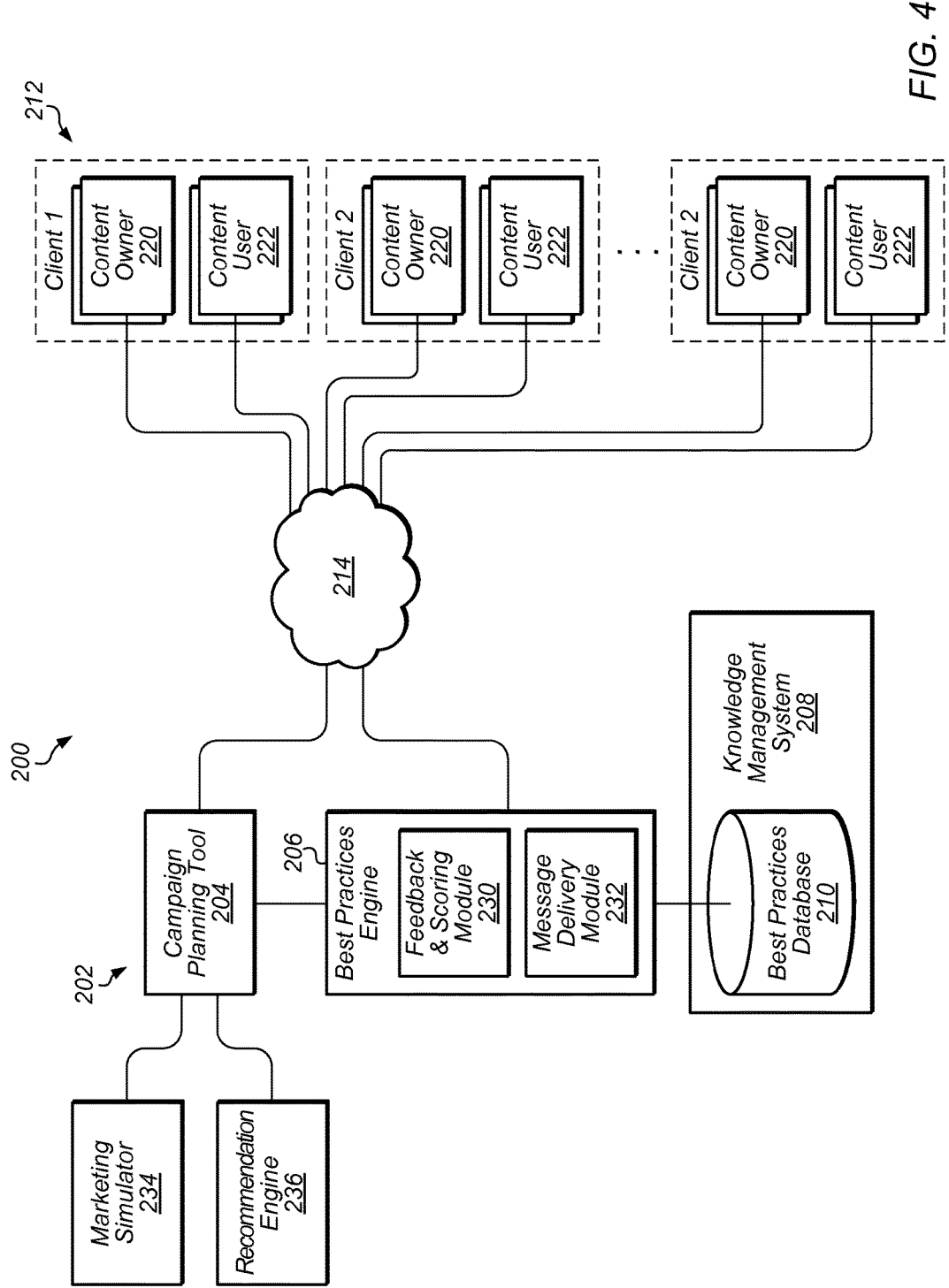
FIG. 4 illustrates one embodiment of a procedure engine that provides access for multiple clients over a network.

In some embodiments, a procedure engine provides for management of, and access to, procedures and practices for multiple clients or organizations. Participants from different organizations may, for example, access a procedure engine over a network, such as the Internet. The procedure engine may be used, in one embodiment, in marketing campaigns carried out by clients. FIG. 4 illustrates one embodiment of a procedure engine that provides access for multiple clients over a network. System 200 includes marketing practices system 202. Marketing practices system 202 includes campaign planning tool 204, best practice engine 206, and knowledge management system 208. Knowledge management system 208 includes best practices database 210. Information relating to practices and procedures may be stored in best practices database 210.

Clients 212 may each include content owners 220 and content users 222. Content owners 220 and content users 22 can access campaign planning tool 204 and best practices engine 206 over network 214. Network 214 may be, for example, the Internet. In some embodiments, content owners 220 and content users 22 access marketing practices system 202 on a personal computer system with a browser.

In some embodiments, marketing practices system 202 acts as a bidirectional conduit for marketing related best practices. Marketing practices system 202 may take in and store new/existing best practices and marketer feedback, and provide on-demand and scheduled delivery of best practices based on pre-defined roles, activities, and campaign characteristics. In some embodiments, the system is used in planning or conducting an online advertising campaign.

Creation, Ownership and Management

Marketing practices system 202 may be seeded with content relating to procedures, such as best practices. Content may be stored on best practices database 210. The seeded content may include one or more clients' existing best practices and procedures.

In some embodiments, content is owned and available only to the particular client or clients that provided the best practices. Some content may be available to all clients, or a subset of clients. For example, some content maybe available only to subscribers for that content.

Content may be a concise version of what currently exists in various other forms (PDF, slide presentations, etc.). Each best practice may include both an abstract (which may be sent by email, for example) and a full-text version (which may be available via the best practice system). Along with the textual content, the system may store supporting documents (e.g. original PDF's, slide presentations, etc.) and external resources such as websites (links to a client's training platform, for example). As best practice content is updated, a simple version may be retained to prevent unintended loss. In some embodiments, version control is implemented as a separate record history. Version control may include a simple visual display indicating differences between versions.

With the initial best practices in the system, ownership for content may be assigned to authors who will be responsible for maintaining and updating the content, as well as assigning the best practices to the appropriate elements (media, milestones, etc.). If an owner cannot be identified, the administrator may retain ownership and control.

As authors move through the creation and maintenance process, an author can designate best practice content as "Final" (active and published) or "Draft" (inactive and unpublished). Once in a "Final" state, that best practice may be available for dissemination based on the campaign/milestone associations assigned by the author.

Marketer Feedback & Response

Procedures stored on best practices system 202 are subject to a rating and commenting system. The rating and commenting system may allow users to provide feedback and insight. Best practices system 202 may accept feedback from any participants, including any of content users 222. As missing best practices or incomplete criteria for existing best practices are identified, best practices system 202 can deliver feedback to the appropriate parties (author, administrator).

As feedback is provided by participants, the feedback can be evaluated, and, if deemed appropriate by the author or administrator, integrated into the best practices system. In some embodiments, a best practice content management area includes a tool to review and respond to provided comments (status such as [dev:"pending review", "addressed", "closed"] and notes). Collected ratings ("How helpful is this to you?") may be used as an indication of whether a best practice is sufficient or requires an update. In some embodiments, the system is keyed off of uniform resource indicator ("URI")-based resources.

Milestones & Activities

Milestones may represent points in time leading up to, through and beyond the execution of a campaign plan. Associated with each milestone may be one or more activities. An activity may represent one or more tasks to be carried out and one or more roles involved in the execution of the activity. For example, as a campaign timeline ticks away, a milestone may be encountered that marks N weeks until campaign execution. The milestone includes two activities, one of which is "Develop Agency Brief." This activity is to be carried out by the "Interactive Marketing—Division Manager" and "Interactive Marketing—Local Marketing Manager." Depending on the media that is being used in the campaign, these activities may call forth specific best practices that relate to those media.

Below is a basic representation of an example of a hierarchy.

Campaign
Milestones (at a minimum: "Campaign Start," "Campaign End")
Activities (0 or more)
Role (0 or more—0 could represent "all")

As milestones approach, reminders/alerts may be sent to participants (e.g. as a campaign start is approaching).

In some embodiments, a set of attributes is established for a campaign or for a set of one or more procedures. The set of attributes may be generated by, or selected by a user from, a campaign planning tool. The attributes for a campaign may determine or satisfy dependencies of a dissemination process for one or more procedures or practices. As example set of attributes includes:

Product type (new, existing)
Campaign timeline (start date, end date)
Marketing levers (list of touch-points to be leveraged)
Target Audience
Campaign budget
Objectives
Product type (new, existing)

In some embodiments, attributes in a campaign can address multiple campaign scenarios, budget optimization and recommendation, copy, and export.

Best practices stored on the system may be media-"agnostic". Accordingly, some best practices may apply to an activity, regardless of the type of media being used in the campaign. Two best practices can be assigned to the same activity, but may typically be differentiated through the associated elements (media, role, etc.), otherwise the best practices may be in conflict. In this case, the system may suggest consolidation. If the two best practices don't share the same ownership (e.g. one is a best practice for Company A and the other a best practice for Company B), one could be "disabled".

Often for a given campaign, milestones may be relatively uniform with respect to campaign's execution, however, the campaign's commencement may be a "moving target". In some embodiments, the system includes one or more participants can suspend a campaign on the system (for example, press a "pause button"). Suspension of a campaign may be used, for example, to help a client deal with campaign scheduling setbacks.

Each campaign may have a default set of standard milestones. Timing (deadline) alterations may be made possible. In some embodiments, timing alterations can be accomplished by allowing milestones to be moved down the line (for example, by a campaign "owner"). In certain embodiments, the system can update milestones automatically. The system may update milestones based on the current date of the campaign start. By moving the campaign start date, for example, all dependent dates may also be moved. Different "sets" of milestones may be available for selection. In some embodiments, a campaign planner can customize a set of milestones. Each customized milestone may be newly created by a campaign planner, a modification of an existing milestone, or a combination of both. The customized milestones can be stored on the system as a default.

Roles & Recipients

The system may house the contact information and role of each participant or campaign stakeholder. Contact information may include basic elements such as name, email address, title, and role (or a combination of roles). Information can be managed by the administrator, or by the users themselves (on an individual level). Upon campaign finalization, contacts can be selected by individual users for the purpose of receiving campaign notifications. In the event that a contact directory houses a large list of personnel, users can organize common contacts into contact groups for simplified selection.

Content Messages

Content messages relating to procedures and practices can be stored in best practices database 210. In some embodiments, content is pushed to a mailing list manager.

Distribution and Delivery

In some embodiments, message delivery module 232 includes a mailing list manager. The mailing list manager may provide visibility of open rates and click through activity. In some embodiments, the mailing list manager provides an API. The API may include some or all of the system's messaging functionality. In some embodiments, contact (for example, stakeholder) lists are managed through a mailing list manager directly. In some embodiments, email templates are held in the mailing list manager and content pushed into them by best practices.

In some embodiments, groups of recipients are built and managed through the mailing list manager API. In some embodiments, the mailing list manager is a source for contact data. In certain embodiments, contact lists are synchronized. Application specific data (e.g. roles) may be carried in the mailing list manager or in another part of best practices engine 206.

The primary delivery process may push appropriate content participants (for example, campaign planners) at appropriate times during the planning process. In one embodiment, the dissemination of best practices content is carried out according to the following criteria:
  Who—Who will benefit from this information?
  What—Under what circumstances (for example, campaign criteria) is this relevant?
  When—When in the planning process is the information actionable?

Each campaign plan may include a set of personnel that are to receive milestone/activity driven notifications and best practices. The system may present a list of personnel for selection. The list of personnel may include email addresses and role(s) along with a mechanism for updating the presented information or adding a new individual. A participant may have the opportunity to "see what they will receive" (milestones and best practice content) with respect to the any given timeline.

The following is an example of copy that may be used at the beginning of a campaign:
"The following parties have been identified as possible participants in the execution of this campaign. Milestone notifications and tactical best practices related to their areas of responsibility will be communicated via email and/or SMS."

Once a plan has been created and saved, the plan may be subject to a background process carried out by the system. The background process may poll the system on a semi-frequent basis for "due" milestones and related activities. If milestones or related activities are found, the system may pull all appropriate best practices associated with the milestone and predefined campaign criteria. The available best practices may be aggregated and dispatched to the selected contacts with matching roles.

Triggers

The system may rely on a series of conditions that must be satisfied in order to trigger an action. In the case of a best practice, the conditions may be combinations of campaign characteristics (assets and targets selected) and scheduled milestones/activities.

Content Tailoring & "Opt-Out"

In some embodiments, content from best practices engine 206 can be tailored for different clients. Clients or participants may choose to opt-out of receiving various elements of content. For example, a client or participants may be given the choice to opt-out of certain messages to comply with CAN-SPAM guidelines (Controlling the Assault of Non-Solicited Pornography and Marketing Act of 2003). The ability to opt-out may also allow recipients the opportunity to individually "opt-out" of information that the participant did not believe was pertinent. In some embodiments, the opt-out request can be made at the campaign level or above. The opt-out decisions may be visible to the administrator.

In some embodiments, opt-out is handled through the mailing list manager. Once a best practice (or series of best practices) is delivered, users may have access to read the abstract, and to return to the best practices systems for the full version and any supporting documents. Users can log into the system, or view the best practice via an obfuscated URL. Non-users may be presented with only the obfuscated URL. In some embodiments, selected content can be collapsed into a single email.

A library of best practices may be available within the system. In some embodiments, a system provides for on-demand browsing or search. In one embodiment, some or all of the participants have the ability to review best practices at three core levels:
  Asset level—for example, the best practices associated with each asset selected during the plan creation process
  Campaign level—for example, a visual timeline providing a window into the best practices involved in a campaign's execution
  System level—the entire library of available best practices, explored, for example, hierarchically or searched by keyword In some embodiments, customers subscribe to modules or sub-systems within a marketing practices system. For example, a client may choose to subscribe or not subscribe to recommendation engine 236. Should a client choose not to subscribe to our recommendation engine, the client may be provided with a campaign planning interface that allows access to campaign-associated best practices.

In the embodiment shown in FIG. 4, best practices engine 206 is used in conjunction with several other functional components, including recommendation engine 236, campaign planning tool 204, marketing simulator 234, and knowledge management system 208. A procedure engine may, nevertheless, be used in some embodiments with or without any of these components. For example, best practices engine 206 may operate as a stand-alone tool, without recommendation engine 236, campaign planning tool 204, marketing simulator 234, or knowledge management system 208.

User Interface

In some embodiments, a system for managing procedures includes a user dashboard. The user dashboard may provide a central view into the activities and contributions of participants using the system. The user dashboard may act as a landing screen for users accessing the system. In some embodiments, each user may be authenticated before access is to the system is provided.

Figure 5:
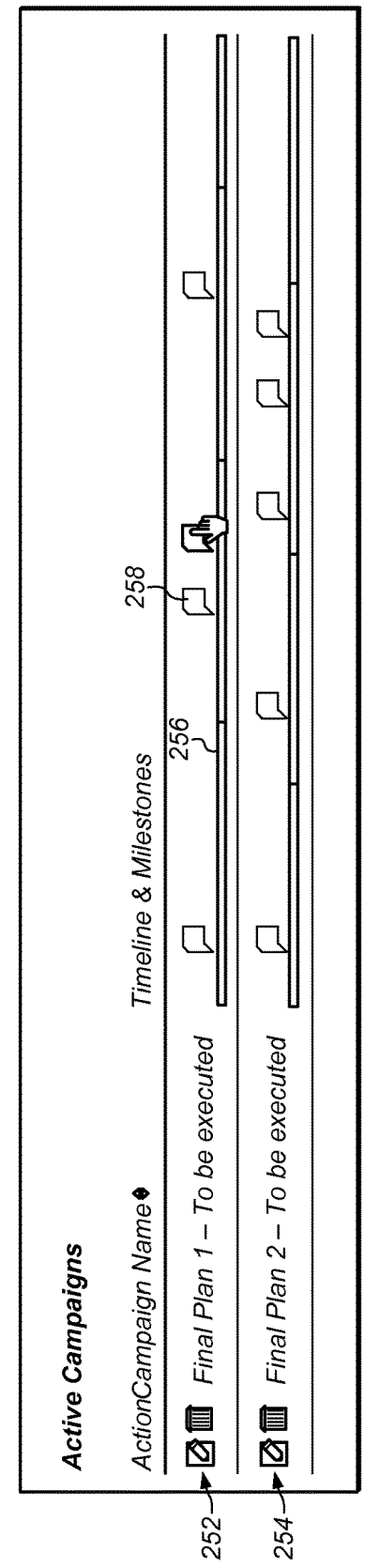
FIG. 5 illustrates one embodiment of a portion of a user dashboard for a best practices system including graphical timelines.

In one embodiment, the user dashboard may provide a view of the following information:
Owned and managed best practices and their statuses and associations
An overview of contributed ratings and comments (counts, etc.)
A list of all upcoming/current campaigns including a visual timeline (detail in campaign dashboard)
A list of all (past) campaigns (older than n months)
A visual timeline FIG. 5 illustrates one embodiment of a portion of a user dashboard for a best practices system including visual timelines. Dashboard 250 includes listing 252 of active campaigns 254. Each of campaigns includes timeline 256 and milestones 258.

As described herein, each campaign plan may have a standard set of milestones along the timeline to execution. The timeline may be displayed to a user on the visual timeline. The displayed timeline may include milestones, activities and best practices. As milestones are missed or plans change, the user may shift milestones. The shift may be left to the discretion of the user.

In some embodiments, if a milestone has been missed, the system may move the milestone to a later time or date. In some cases, one or more later milestones may be shifted in response to a slide in a milestone that was missed. In other cases, the system may not shift later milestones to accommodate the new alteration. Thus, the milestone may be moved closer to the next milestone on the timeline. In certain embodiments, only certain participants (such as the campaign owner or administrator) have the authority to move milestones, or to allow a shift of one milestone to affect other milestones.

Conditions

Campaign plans can be edited, therefore trigger conditions need to be evaluated at runtime. If a previously encountered milestone (with dispatched best practices) is rescheduled in the future, the system may resend the best practices as that new date is encountered. This prevents the need to track the history of specific milestones and best practices.

Figure 6:
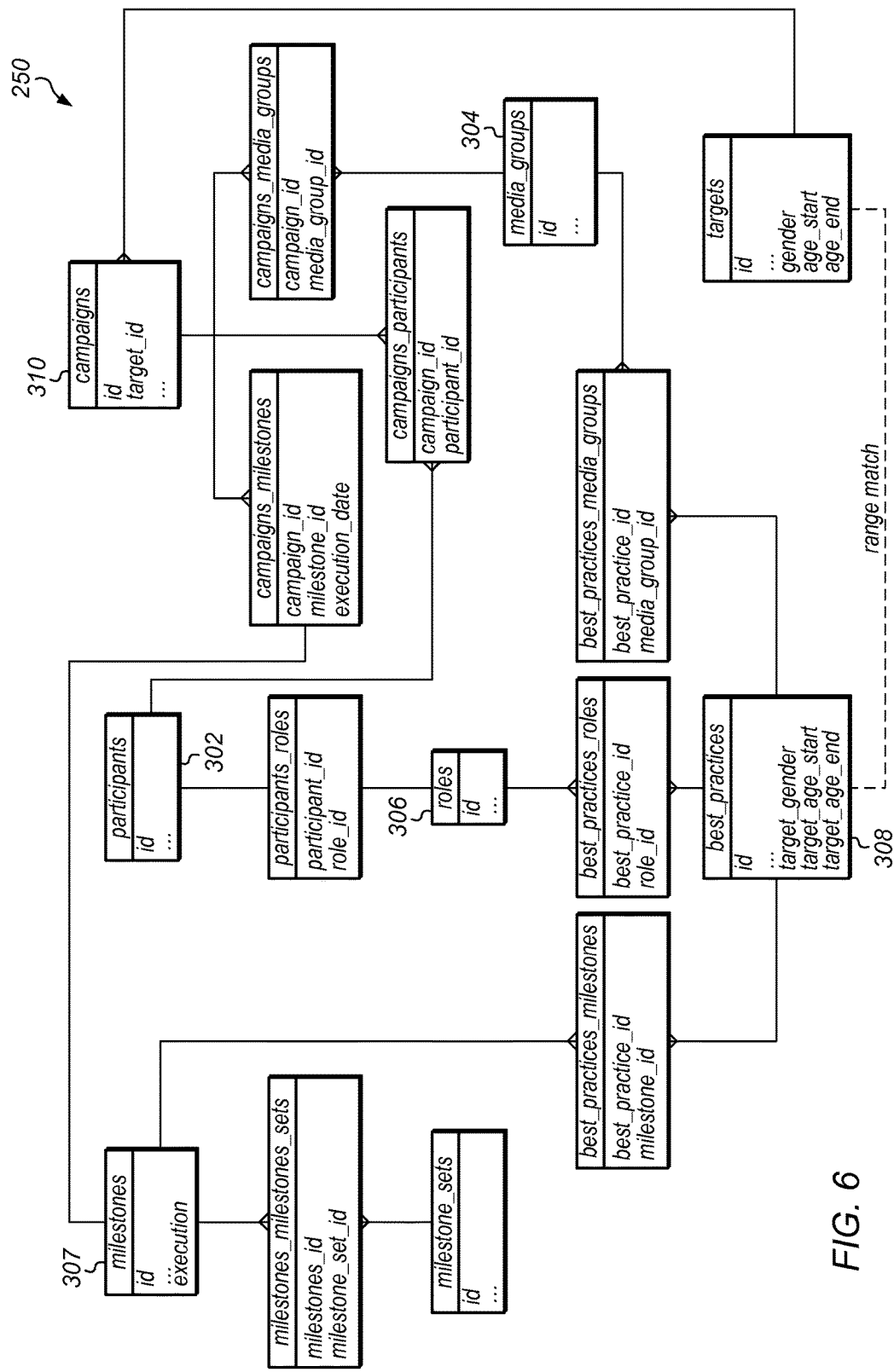
FIG. 6 is a diagram illustrating relationships established in a procedure engine according to one embodiment.

FIG. 6 is a diagram illustrating relationships in a procedure engine according to one embodiment. Participants 302 and media groups 304 may be established in the system. Each of participants 302 may be an individual that has access to the system. Each participant 302 and media group 304 may have an ID. Roles 306 may be established for carrying out various aspects of procedures.

Milestones 307 and best practices 308 may be established. Milestones 307 and best practices 308 can be used in various campaigns 310. Each of best practices 308 can be associated with one or more target attributes, such as gender and age range.

Milestones sets 312 can be established. Milestones 307 can be associated with one or more milestones sets 312. For example, a media campaign may have a commencement date, an end date, and one or more intermediate assessment points.

Each of best practices 308 can be associated with one or more milestones 307, roles 306, and media groups 304.

Targets 320 may be established for use in various of campaigns 310. Each of targets 320 may have an ID and one or more attributes.

When a campaign 310 is to be undertaken, the campaign may be given an ID. The campaign 310 may be associated with one or more targets 320 by way of target IDs. The campaign may also be associated with one or more participants 302, media groups 304, and milestones 307. Best practices may be established for the campaign 310. In some embodiments, best practices are identified by conducting a range match on the attributes associated with targets 320 for the campaign.

Figure 7:
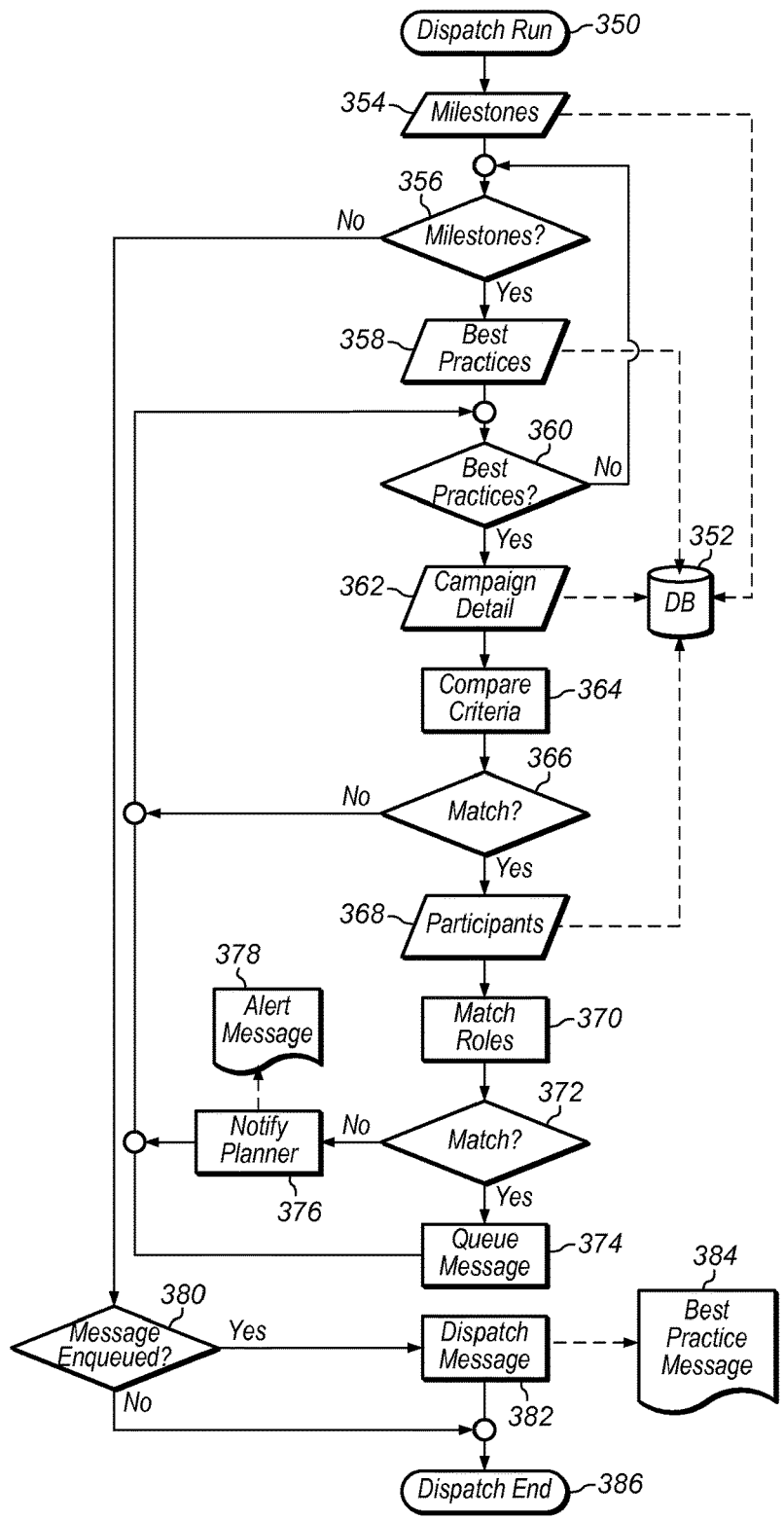
FIG. 7 illustrates one embodiment a dispatch for a campaign that includes sending best practice content messages to participants.

In some embodiments, a system dispatches messages to participants relating to procedures and practices. The dispatches may occur periodically, for example, on a daily basis or a weekly basis. In some embodiments, a best practice is not dispatched until the best practice (1) is associated with a milestone; and (2) meets specified criteria. FIG. 7 illustrates one embodiment a dispatch for a campaign that includes sending best practice content messages to participants. At 350, the dispatch is commenced. At various points during the dispatch, information may be stored on or retrieved from database 352. At 354, milestones are identified for the dispatch. The milestones may be, for example, all the milestones on the system with an execution data of "today".

At 356, the system may process milestones for the campaign. The system may continue to query the database as long as milestones meeting the criteria exist (for example, milestones with an execution date of today. If a milestone exists, best practices associated with the milestone are identified at 358. At 360, if a best practice associated with the milestone exists, campaign details are identified at 362. Campaign details may include, for example, selected media groups and target audience. At 364, best practice criteria may be compared. If a match occurs, participants are identified at 368.

At 370, the system attempts to match roles to participants. At 372, if a match between a role and a participant exists, an email message relating to the best practice is queued for the participant. If no match between a role and a participant is found, a planner may be notified at 376. In some embodiments, alert message 378 (for example, email message or text message) may be sent.

Returning to 356, the system may continue to query the database as long as milestones meeting the criteria exist (for example, milestones with an execution date of today). For each milestone found, the system may generate best practice content messages as described above relative to 358 through 374. When no additional milestones exist, the system may determine at 380 whether any messages have been enqueued (for example, one or more messages associated with best practices enqueued at 374). If a message has been enqueued, messages 384 are sent at 382. Message 384 may be, for example, an email message or a text message. In some embodiments, for each dispatch, a single, consolidated message is sent to each participant for each campaign. For example, a campaign planner may receive one daily message for Campaign A, another daily message for campaign B, etc.

At 386, the dispatch ends.

Although various systems and uses described above relate to marketing applications, the systems described above can be used for procedures and practices in any field or endeavor. Examples of other applications for a procedure engine include. manufacturing, medical care, health promotion programs, disease prevention programs, and inventory management. In one embodiment, methods and systems described herein are used in a malaria intervention program. A tactical best practice in a malaria intervention program may establish, for example, a manner of employing mosquito nets.

Computer systems may, in various embodiments, include components such as a CPU with an associated memory medium such as Compact Disc Read-Only Memory (CD-ROM). The memory medium may store program instructions for computer programs. The program instructions may be executable by the CPU. Computer systems may further include a display device such as monitor, an alphanumeric input device such as keyboard, and a directional input device such as mouse. Computer systems may be operable to execute the computer programs to implement computer-implemented systems and methods.

A computer system may allow access to participants by way of any browser or operating system.

Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

In one embodiment, a procedure engine system resides in an environment including the following resources:
  Linux (Debian dev:Lenny)
  PHP 5.2.x (Zend Framework 1.10.6+)
  MySQL 5.0.x
  Memcached
  jQuery (latest)
Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of implementing a procedure in one or more organizations, comprising:
    storing, in a memory of a computer system, one or more content messages relating to one or more procedures;
    identifying a procedure to be performed by one or more responsible persons; generating, by the computer system, a workflow timeline for the procedure, wherein the workflow timeline comprises one or more actions for the procedure, a sequence for at least one of the one or more actions, and one or more responsible persons assigned to one or more of the actions;
    receiving, by a procedure engine, from a timeline initiator, an activation for the workflow timeline;
    automatically determining, by the procedure engine, after receiving the activation for the workflow timeline:
    a time or a due date for performing one or more actions on the workflow timeline;
    a responsible person to perform at least one of the one or more actions; and
    one or more content messages for at least one of the actions, wherein the content message provides information relating to the procedure, wherein the content message is based on at least one of the content messages stored in the computer system;
    automatically sending, by the computer system, at least one of the content messages to the responsible person determined for the one or more actions, receiving, by the procedure engine, feedback from a user of one or more content messages in carrying out the procedure, wherein the feedback comprises:
    an assessment by the user of relevance or usefulness of content of at least one of the content messages;
    or comments by the user about content of at least one of the content messages;
    receiving, by the procedure engine, one or more outside content feeds;
    scoring, by the procedure engine, at least one of the outside content feeds, wherein the scoring is based, at least in part, on which workflow tasks the outside content feed relates to, based, at least in part, on which content users would find the content relevant, and based, at least in part, on how current the content is, wherein an age of the content is determined automatically;

modifying, by the procedure engine, based on the feedback from the user, the procedure, wherein modifying the procedure comprises automatically modifying a standard for the procedure; and modifying, based on the feedback received from the user, at least one content message applicable to the procedure.

2. The method of claim 1, wherein the procedure comprises a best practice.

3. The method of claim 1, further comprising:
receiving one or more values for one or more situational variables, wherein the content message determined for at least one of the actions is based, at least in part, on at least one of the values received for the situational variables.

4. The method of claim 3, wherein the value received for the situational variable modifies a best practice recommendation pushed to the user for the procedure.

5. The method of claim 3, wherein the value received for the situational variable filters at least one of the content messages for the procedure.

6. The method of claim 3, wherein a value for at least one of the situational variables is received from the timeline initiator.

7. The method of claim 1, wherein at least one of the content messages comprises one or more upcoming actions.

8. The method of claim 1, wherein the procedure comprises a marketing campaign.

9. The method of claim 1, wherein the procedure comprises a best practice for using at least one media asset.

10. The method of claim 1, wherein the procedure comprises online advertising.

11. The method of claim 1, wherein the at least one content message applicable to the procedure is modified for only the user providing the feedback.

12. The method of claim 1, wherein the at least one content message applicable to the procedure is modified for the user providing the feedback and one or more users other than the user providing the feedback.

13. The method of claim 1, wherein the feedback comprises an assessment by the user of relevance of content in at least one of the content messages.

14. The method of claim 1, wherein the feedback comprises an assessment by the user of usefulness of content in at least one of the content messages.

15. The method of claim 1, wherein the feedback comprises a ranking by the user of relevance of content in at least one of the content messages.

16. The method of claim 1, further comprising a set of attributes for the procedure, wherein the set of attributes addresses budget optimization.

17. The method of claim 1, further comprising searching, by the procedure engine, a library of content, wherein the content comprises a plurality of practices, wherein the search is performed at two or more of:
an asset level, wherein the asset level comprises one or more practices associated with each asset selected during the plan creation process;
a campaign level, wherein a visual timeline provides a window into one or more practices involved in a campaign's execution; and
a system level, wherein the search comprises a library of available practices by hierarchically search or by keyword.

18. A system, comprising:
a processor;
a memory coupled to the processor and configured to store program instructions executable by the processor to implement:
storing, in the memory, one or more content messages relating to one or more procedures;
identifying a procedure to be performed by one or more responsible persons;
generating, by a computer system, a workflow timeline for the procedure, wherein the workflow timeline comprises one or more actions for the procedure, a sequence for at least one of the one or more actions, and one or more responsible persons assigned to one or more of the actions;
receiving, by a procedure engine, from a timeline initiator, an activation for the workflow timeline;
automatically determining, after receiving the activation for the workflow timeline:
a time or a due date for performing one or more actions on the workflow timeline;
a responsible person to perform at least one of the one or more actions; and
one or more content messages for at least one of the actions, wherein the content message provides information relating to the procedure, wherein the content message is based on at least one of the content messages stored in the computer system;
automatically sending at least one of the content messages to the responsible person determined for the one or more actions;
receiving feedback from a user of one or more content messages in carrying out the procedure, wherein the feedback comprises:
an assessment by the user of relevance or usefulness of content of at least one of the content messages;
or comments by the user about content of at least one of the content messages;
receiving, by the procedure engine, one or more outside content feeds;
scoring, by the procedure engine, at least one of the outside content feeds, wherein the scoring is based, at least in part, on which workflow tasks the outside content feed relates to, based, at least in part, on which content users would find the content relevant, and based, at least in part, on how current the content is, wherein an age of the content is determined automatically;
modifying, by the procedure engine, based on the feedback from the user, the procedure, wherein modifying the procedure comprises automatically modifying a standard for the procedure; and
modifying, based on the feedback by the user, at least one content message applicable to the procedure.

19. A tangible, non-transitory computer readable medium comprising program instructions, wherein the program instructions are computer-executable to implement:
storing, in a memory of a computer system, one or more content messages relating to one or more procedures;
identifying a procedure to be performed by one or more responsible persons;
generating, by the computer system, a workflow timeline for the procedure, wherein the workflow timeline comprises one or more actions for the procedure, a sequence for at least one of the one or more actions, and one or more responsible persons assigned to one or more of the actions;

receiving, by a procedure engine, from a timeline initiator, an activation for the workflow timeline;

automatically determining, by the computer system, after receiving the activation for the workflow timeline:

a time or a due date for performing one or more actions on the workflow timeline;

a responsible person to perform at least one of the one or more actions; and one or more content messages for at least one of the actions, wherein the content message provides information relating to the procedure, wherein the content message is based on at least one of the content messages stored in the computer system;

automatically sending, by the computer system, at least one of the content messages to the responsible person determined for the one or more actions;

receiving feedback from a user of one or more content messages in carrying out the procedure, wherein the feedback comprises:

an assessment by the user of relevance or usefulness of content of at least one of the content messages;

or comments by the user about content of at least one of the content messages;

receiving, by the procedure engine, one or more outside content feeds;

scoring, by the procedure engine, at least one of the outside content feeds, wherein the scoring is based, at least in part, on which workflow tasks the outside content feed relates to, based, at least in part, on which content users would find the content relevant, and based, at least in part, on how current the content is, wherein an age of the content is determined automatically;

modifying, by the procedure engine, based on the feedback from the user, the procedure, wherein modifying the procedure comprises automatically modifying a standard for the procedure; and modifying, based on the feedback by the user, at least one content message applicable to the procedure.

* * * * *